United States Patent

Shimada et al.

Patent Number: 5,948,112
Date of Patent: Sep. 7, 1999

[54] METHOD AND APPARATUS FOR RECOVERING FROM SOFTWARE FAULTS

[75] Inventors: Tomofumi Shimada, Saitama-ken; Hideaki Hirayama, Kanagawa-ken; Masaharu Nozaki, Tokyo, all of Japan

[73] Assignee: Kabushiki Kaisha Toshiba, Kawasaki, Japan

[21] Appl. No.: 08/820,718

[22] Filed: Mar. 18, 1997

[30] Foreign Application Priority Data

Mar. 19, 1996 [JP] Japan ................................ 8-062840

[51] Int. Cl.⁶ .................................................. G06F 11/14
[52] U.S. Cl. ................................................ 714/16; 714/38
[58] Field of Search ................... 395/182.01, 182.13, 395/182.14, 182.15, 182.17, 182.18, 183.14, 569; 364/285.2; 707/202; 371/35

[56] References Cited

U.S. PATENT DOCUMENTS

| | | | |
|---|---|---|---|
| 5,428,618 | 6/1995 | Ueki et al. | 395/182.14 |
| 5,590,277 | 12/1996 | Fuchs et al. | 395/182.14 |
| 5,630,047 | 5/1997 | Wang | 395/182.15 |

OTHER PUBLICATIONS

Bernstein, Philip A., "Sequoia: A Fault–Tolerant Tightly Coupled Multiprocessor for Transaction Processing," Computer, vol. 21, No. 2, Feb. 1988, pp. 37–45.

Silva et al., "Global Checkpointing for Distributed Programs", IEEE Publication, pp. 155–162, 1992.

Primary Examiner—Robert W. Beausoliel, Jr.
Assistant Examiner—Scott T. Baderman
Attorney, Agent, or Firm—Finnegan, Henderson, Farabow, Garrett & Dunner, L.L.P.

[57] ABSTRACT

A method for recovering from software fault in a fault tolerant computing system includes a system status recording step to record the system status at the occurrence of the above software fault when the above fault is judged to be a software fault by a fault identifying step, a software fault factor diagnosing step to diagnose the fault factor of the above software fault, a software fault recovery action determining step to determine a recovery action to the above fault factor of the above software fault, and a software fault recovery action executing step to execute the recovery action the above fault factor of the above software fault determined by the above software fault recovery action determining step after roll back.

34 Claims, 8 Drawing Sheets

METHOD AND APPARATUS FOR RECOVERING FROM SOFTWARE FAULTS

BACKGROUND OF THE INVENTION

1. Field of the Invention

The present invention relates to method and apparatus for recovering from faults in a checkponting and roll back type fault tolerant computing system which can dynamically avoid faults by rolling back the processing to a previous checkpoint which was acquired just before the software fault occurs.

More particualarly, the present invention relates to method and apparatus for recovering from software faults in a checkpointing and roll back recovery type fault tolerant computing system.

In particular, the present invention relates to method and apparatus for dynamically avoiding the system being down due to software faults which occur in a kernel portion of the operating system for the checkpointing and roll back recovery type fault tolerant type computing system.

2. Discussion of the Background

Various kinds of fault recovery techniques have been developed in computing systems for achieving higher reliability of the computing systems. It is now required to achieve much higher reliabilty by quick recovery from faults with a minimum amount of disruption for the recovery process.

A checkpointiong and roll back recovery from faults is one technique for achieving such a high reliability by achieving quick recovery from faults in fault tolerant type computing systems.

In the checkpointing and roll back recovery type fault tolerant computing system, during normal data processing, execution information of the data processing has been stored at a certain time interval for restarting the data processing from a particular point when a fault occurs in the processing. This operation for storing the execution information at a particular point is referred to as a checkpoint acquisition.

FIG. 8 shows the principle of the checkpointing. Usually, checkpoints(1) and (2) are periodically acquired at a certain time interval. If a transient hardware fault(3) occurs and interrupts the executed processing, the state of the interrupted process or the thread is rolled back (4) to a previous checkpoint(2) which was acquired just before the occurrence of the fault(3) and the processing is restarted from the checkpoint(5).

The stored execution information by the checkpointing includes an internal content in general purpose registers and data in a cache memory or a main memory.

Generally, causes of a computer system down condition classified into hardware faults and software faults. The checkpointing and restarting type fault tolerant computing system is extremely useful for avoiding the hardware fault. For example it is useful for avoiding a main memory ECC error.

On the contrary, it is difficult to recover from a system down condition caused by software faults. In particular, it is the most difficult to avoid a system down condition which is caused by bugs which appear within a kernel portion of the operating system for the computer or an application process.

Usually, such software faults bring the computer system down or bring all of the application process stack. Also software faults caused by bugs in an application process usually bring the process to an abnormal end.

For avoiding these type of system down conditions caused by software faults, a progressive retrial method of a software module has been proposed. The method is to improve the fault tolerance of the system which includes a plurality of application processes by providing a special software library. The software library stores a state of the application process periodically in a nonvolatile memory (i.e., checkpointing).

By registering a transmitting message into a sender log file and also by registering a received message into a receiver log file, it becomes possible to restart the process execution from a checkpoint when a fault occurs.

If the reexecution process does not start, the rolling back area is gradually expanded with reference to the registered message in the sender log file.

Further, it is possible to avoid timing dependent software faults by changing the registering order of the received message in the receiver file within the scope that the total coordination of the received message can be maintained.

The proposed method achieves the fault tolerance of the computer system by using the software library in the application process and the main method for avoiding timing dependent software faults is to change the order of the communication message for transmitting or receiving between nodes within the scope that the total coordination of the received message can be maintained. This method is useful for avoiding the timing dependent software faults.

However, the proposed method cannot recover software faults thats occur in an application process level because the system itself is brought down when the software fault occurs in the operating system kernel.

SUMMARY OF THE INVENTION

Accordingly, it is an object of the present invention to provide method and apparatus for avoiding a system down condition caused by software faults in an operating system kernel.

It is another object of this invention to provide method and apparatus for avoiding software faults in a checkpointing and roll back recovery type fault tolerant computing system.

It is further object of this invention to provide method and apparatus for achieving a high reliability a system having a high recovery function from software faults in an operating system.

It is still another object of this invention to provide method and apparatus for eliminating software faults as quickly as possible by presuming a factor of the software faults.

It is still another object of this invention to provide a method for improving a system maintenance ability for the computing system by dynamically changing a software module which has a software fault to a normal one without stopping the data processing.

The method for recovering from software faults in a checkpointing and roll back recovery type fault tolerant computing system according to the present invention is characterized by steps of detecting faults between particular checkpoints, identifying whether or not the fault is a software fault, recording a faulty portion of an internal state of the system, diagnosing a type of the software fault by using the faulty portion of an internal state of the system, determining a an recovery action for the diagnosed type of the software fault, and executing the recovery action when the internal state of the system rolled back to a checkpoint which was acquired just before occurrence of the detected fault.

The first apparatus for recovering from faults in a checkpointing and roll back recovery type fault tolerant computing system according to the present invention comprises a first module for identifying whether or not the fault is a software fault, a second module for diagnosing a type of the software fault by using the faulty portion of an internal state of the system, a third module for determine a recovery action for the diagnosed type of the software fault, and a fourth module for executing the recovery action when the internal state of the system rolled back to a checkpoint which was acquired just before occurrence of the detected fault.

By including the reexecution module after the module for avoiding the software fault, the apparatus according to the present invention can recover from both of the software faults and the hardware faults.

The second method for recovering from software faults in a checkpointing and roll back recovery type fault tolerant computing system according to the present invention is characterized by steps of identifying the fault as a software fault, recording a state of the system when the software fault occurs and changing the resources of the computing system for restarting the data processing from the checkpoint. Namely, the characteristic feature of the second recovering method is to change the resources of the computing system for restarting the data processing an environment of resituating program from one processor at a first trial of the reexecution and then all of the processors in the system execute the restart operation.

The third method for recovering from software faults in a checkpointing and roll back recovery type fault tolerant computing system according to the present invention is characterized by steps of identifying the fault as a software fault, recording a state of the system when a software fault occurs, diagnosing a type of the software fault based on the recorded faulty state, determining a recovering process from the fault based on the diagnosed fault type, executing the recovering process when a data processing rolls back to a previously acquired checkpoint and changing the resources of the computing system for restarting the data processing from the rolled back checkpoint based on the state of the software fault occurrence for avoiding the software fault.

Namely, the third method is characterized to perform the software avoiding process by a combined process of the first method and the second method.

The fourth method for recovering from software faults in a checkpointing and roll back recovery type fault tolerant computing system according to the present invention is characterized by steps of avoiding the software fault or the changing step of the resources of the computing system for restarting the data processing program is repeated until avoiding the software fault within a predetermined limitation of the repeat number.

The fifth method for recovering from software faults in a checkpointing and roll back recovery type fault tolerant computing system according to the present invention is characterized by steps including separating the fault module from the system when the software fault occurs again after avoiding the software fault or after the changing of the resources in the computing system.

The sixth method for recovering from software faults in a checkpointing and roll back recovery type fault tolerant computing system according to the present invention is characterized in that the restart process is executed after deleting the fault module or the thread.

The seventh method for recovering from software faults in a checkpointing and roll back recovery type fault tolerant computing system according to the present invention is characterized in that the restart process is dynamically changed from the fault module to a software module which is eliminated the fault.

The eighth method for recovering from software faults in a checkpointing and roll back recovery type fault tolerant computing system according to the present invention is characterized in that the system is restarted if a fault occurs again after repeating the recovering processes until the limited number.

The ninth method for recovering from software faults in a checkpointing and roll back recovery type fault tolerant computing system according to the present invention is characterized in that the state of the system when the software fault occurs is recorded to a volatile or a non-roll back area in the memory for analyzing the cause of the fault.

The tenth method for recovering from software faults in a checkpointing and roll back recovery type fault tolerant computing system according to the present invention is characterized in that the assumed cause of the fault occurrence is recorded to a volatile or a non-roll back area in the memory for analyzing the cause of the fault.

The eleventh method of the present invention is characterized in that the assumed software fault avoiding process is stored in a non-volatile memory or a memory that is not rolled back. This feature increases the stability of system maintenance.

The twelfth method for recovering from software faults in a checkpointing and roll back recovery type fault tolerant computing system according to the present invention is characterized in that the damped information relating to the execution of the fault avoiding process is recorded to a volatile or a non-roll back area in the memory for increasing the maintenance of the system.

The thirteenth method for recovering from software faults in a checkpointing and roll back recovery type fault tolerant computing system according to the present invention is characterized in that the number of the processor is changed for avoiding the fault.

The fourteenth method for recovering from software faults in a checkpointing and roll back recovery type fault tolerant computing system according to the present invention is characterized in that changing the resources of the computer system for restarting the data processing clears an automatic variable area in the fault process or a thread for preventing from forgetting initialization of the automatic variable.

The fifteenth method for recovering from software faults in a checkpointing and roll back recovery type fault tolerant computing system according to the present invention is characterized in that the resources in the system are dynamically included as a device for the restarting of the data processing for avoiding the shortage of the resources.

The sixteenth method for recovering from software faults in a checkpointing and roll back recovery type fault tolerant computing system according to the present invention is characterized in that the resource changing process for restarting the data processing includes a step for adjusting issue timing of input/output requests for avoiding the occurrence of the fault.

The seventeenth method of the present invention is characterized in that the reason of the software fault is assumed that it happened because of accessing to a virtual memory while it is not loaded on a physical memory. Then the assumed software fault avoiding process is executed when a physical memory relating to the virtual memory is assumed to be secured. This method makes it possible to avoid an occurrence of an impossible state for a paging.

The eighteenth method of the present invention is characterized in that the software fault factor assuming step assumes that dead-locking relating to an exclusive control in a multi-processor environment is the reason for the fault. Then, the assumed fault avoiding step is executed when it is assumed that the number of the working processors are changed or the code for executing the exclusive control has been changed.

The nineteenth method for recovering from software faults in a checkpointing and roll back recovery type fault tolerant computing system according to the present invention is characterized in that when a dead lock avoiding process is executed in an exclusive control for a multiprocessor system, the number of the processor and the exclusive control code are released to the original state after avoiding the fault.

The twentieth method for recovering from software faults in a checkpointing and roll back recovery type fault tolerant computing system according to the present invention is characterized in that the information for storing in the volatile memory is stored through a log mechanism in the system for improving the maintenance of the system after the recovery.

DETAILED EXPLANATION OF THE PREFERRED EMBODIMENTS

Figure 1:
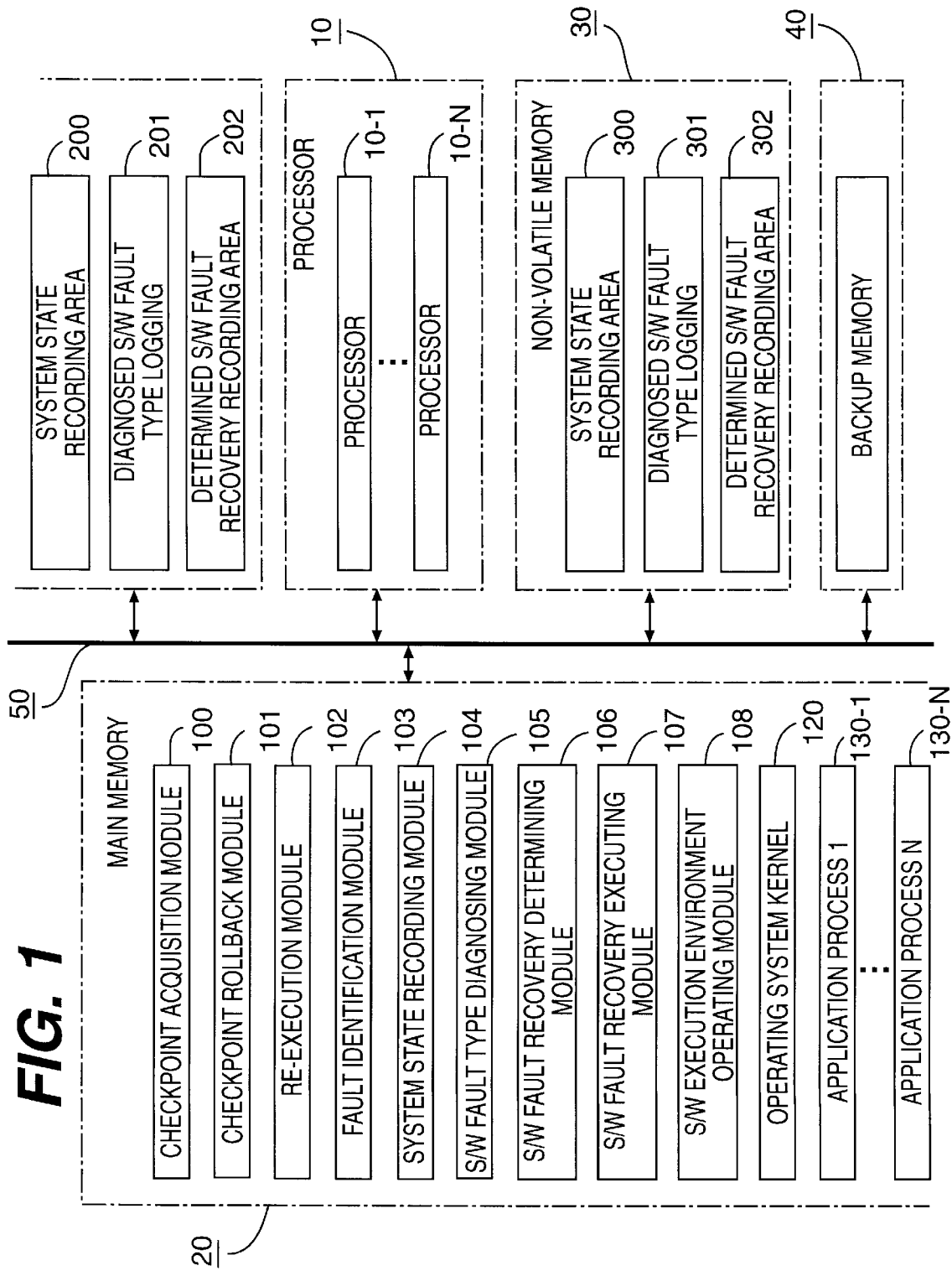
FIG. 1 is a schematic block diagram for explaining a preferred embodiment of a checkpointing and roll back recovery type fault tolerant computing system according to the present invention.

FIG. 1 shows a schematic diagram of a preferred embodiment of a checkpointing and roll back recovery type fault tolerant computing system according to the present invention.

A plurality of processors 10-1, . . . , 10-N control the respective data processing in the system. The numeral 20 indicates a main memory for storing data for a data processing in the plurality of processors. The numeral 30 is a non-volatile memory for recording faults which occurred during the data processing and the numeral 40 is a backup memory.

The processors are commonly coupled to the main memory 20, the non-volatile memory 30 and the backup memory 40 respectively through a processor bus 50.

A checkpoint acquisition module 100 in the main memory 20 is a software module for acquiring checkpoints of an internal state of the computing system. The internal state of the processors and the related data in the main memory are saved into the backup memory 40.

A roll back module 101 is a software module for restoring the internal state of the computing system at a most recently acquired checkpoint. It restores the internal state of the main memory according to the content of the backup memory 40.

A restart or reexecution module 102 is a software module for running the processors with the internal state of the most recently acquired checkpoint.

The checkpointing method is not limited to the above-explained method. For example, Sequia discloses an efficient method for acquiring checkpoints in a publication entitled A fault-tolerant tightly coupled multiprocessor for transaction processing", IEEE Computer, February 1988.

The method according to the present invention is applicable to any kind of checkpointing and roll back recovery type computing system as far as the checkpoint includes the internal state in the main memory in use.

A fault identification module 103 is a software module for distinguishing software faults from hardware faults when a fault occurs.

A system state recording module 104 is a software module for recording the state of the software fault when the fault identifying module 103 identifies the fault as a software fault.

A software (S/W) fault factor diagnosing module 105 is a software module for assuming causes for the occurrence of the identified software fault. A software fault recovery determining module 106 is a software module for assuming a method for avoiding the identified software fault.

A software fault recovery executing module 107 is a software module for executing the avoiding method which is assumed in the software fault recovery determining module 106 before the restart module 102 runs the processors with the internal state of the most recently acquired checkpoint reexecution of the system.

In FIG. 1, block 107 is a software fault recovery action executing module that executes the software fault recovery action diagnosed by the above software fault recovery action determining module 106 before system roll back by the above system roll back module 101.

Block 108 is a software execution environment operating module that is executed after roll back in the case when it is difficult for the above software fault factor diagnosing module 105 to diagnose a fault factor of the software fault concerned.

Memory 30 includes a software fault system state recording area 200 into which system status (processor register, stack contents, etc.) at the software fault concerned is recorded by the above system state recording module 104 when the fault is judged as a software fault by the fault identification module 103, a software fault factor log 201 into which a fault factor of the software fault diagnosed by the above software fault factor diagnosing module 105 is recorded, a software fault recovery action recording area 202 into which the software fault recovery action in response to the software fault diagnosed by the above software fault recovery action determining module 106 is recorded, and the like.

Non-volatile memory 30 includes a software fault system state recording area 300 into which the same contents as are written into the above software fault system state recording area 200 are written, a software fault factor log 301 into which the same contents as are written into the above software fault factor log 201 are written, and a software fault recovery action recording area 302 into which the same contents as are written into the above software fault recovery action recording area 202 are written and the like.

Either one or both of the above memory 20 and the above non-volatile memory 30 may be arranged in a computer system in a selective manner. However, in the case of implementing memory 20, it must be a memory that cannot be rolled back by checkpointing and roll back.

The action flow of a computer system according to a first embodiment of the present invention is explained hereinafter in reference to the flowchart shown in FIG. 2.

Figure 2:
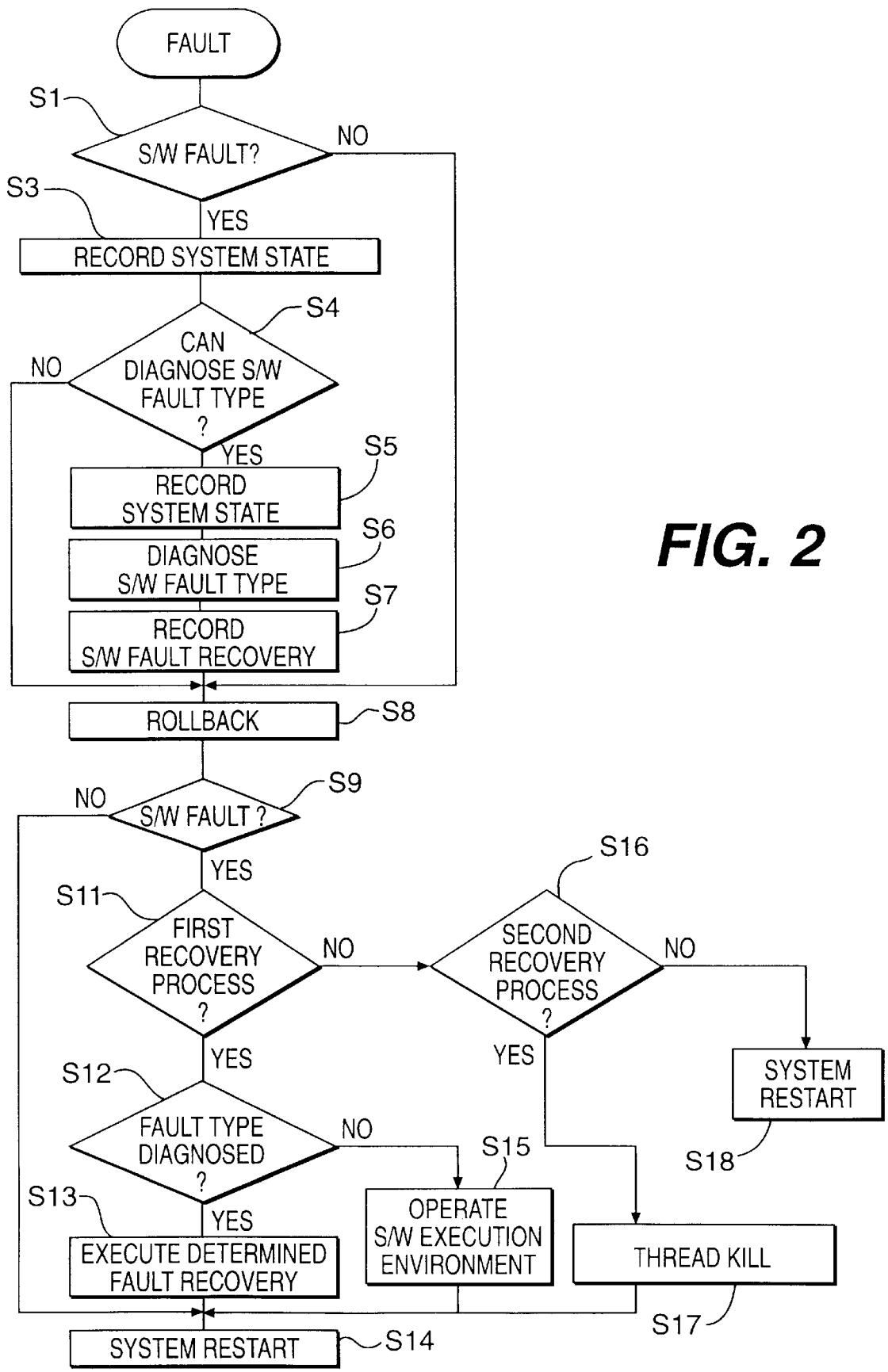
FIG. 2 is a flow chart for explaining operation of a first embodiment for recovery from a software fault.

At the occurrence of a fault with system, the fault identification module 103 identifies whether the fault is a hardware fault (a fault arising from hardware trouble) or a software fault (one arising from software bug) (step S1 in FIG. 2).

In general, a hardware fault is detected by a hardware mechanism, and is informed to software by fault interruption.

On the other hand, a software fault is detected by logic coherence check(assert, panic routine, etc.) or exception or so by software.

The above fault identification module 103 is executed by these detecting mechanisms, and identifies fault.

Herein, when the fault is judged as a hardware fault, system roll back is carried out by the checkpointing and roll back module 101 (steps Si and S8 in FIG. 2).

In this embodiment, a detailed description as to how to cope with a hardware fault is omitted, since it is same as in a general checkpointing and roll back type computer.

Figure 3:
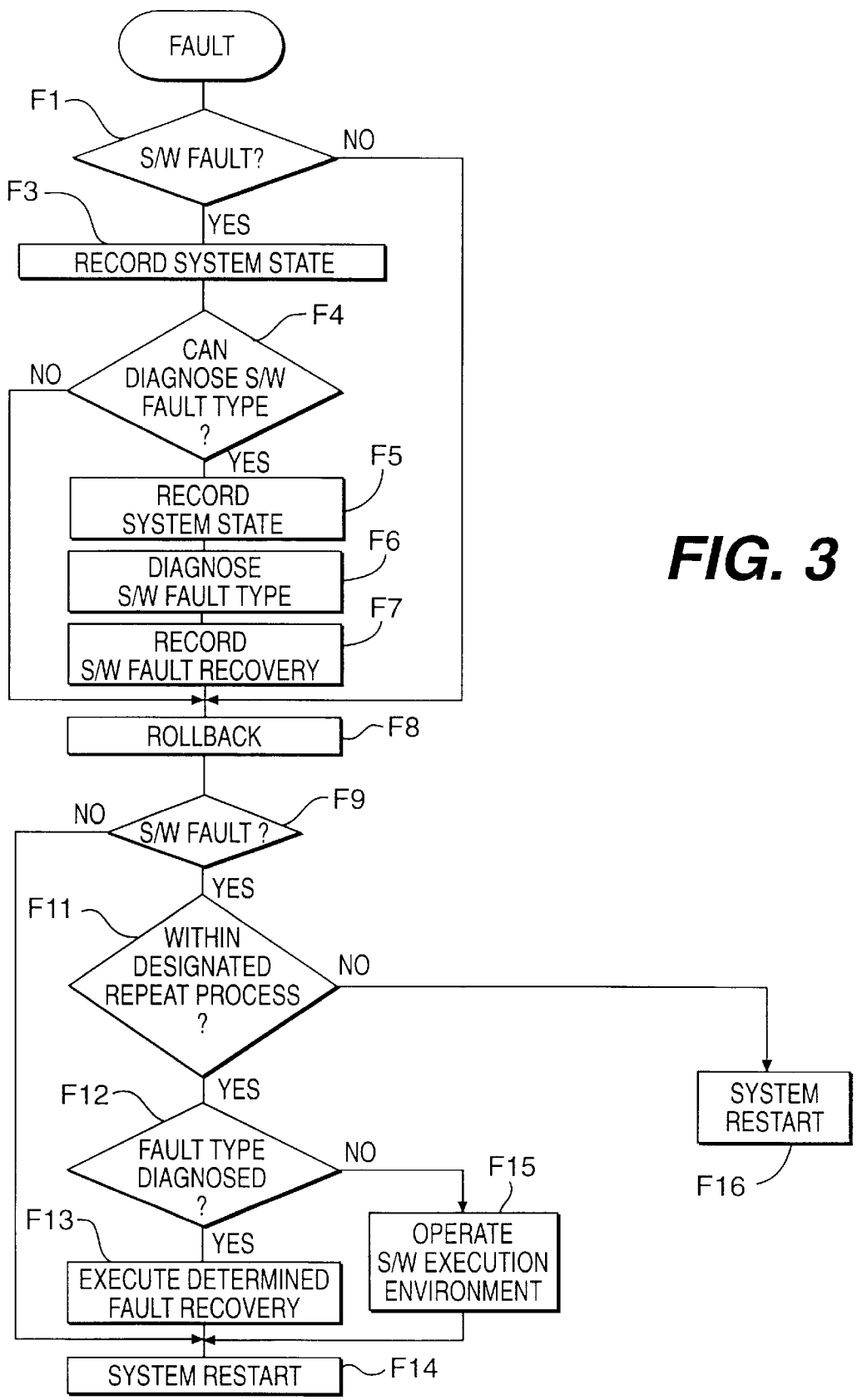
FIG. 3 is a flow chart for explaining operation of a second embodiment for recovery from a software fault.

When the fault is judged as a software fault, the system status (processor register, stack contents, etc.) is recorded into the software fault status recording areas 200 and 300 by the system state recording means 104 (step S3 in FIG. 3). As an option, a dump of system memory, data on each device and so on may be written into an external memory device for bug analysis at a later time.

The software fault factor diagnosing module 105 judges whether the software fault factor concerned can be diagnosed or not, and if it judges it impossible, system roll back is carried out by the checkpointing and roll back module 101 (steps S4 and S8 in FIG. 2).

When the software fault factor concerned can be diagnosed, the fault factor of the software fault diagnosed by the software fault factor diagnosing module 105 is recorded into the software fault factor logs 201 and 301(step S5 in FIG. 2).

Then the recovery action of the software fault concerned is diagnosed by the software fault recovery action determining module 106 (step S6 in FIG. 2), and the software fault recovery action concerned is recorded into the software fault recovery action recording areas 202 and 302(step S7 in FIG. 2), and system roll back is carried out by the checkpointing and roll back means 101 (step S8 in FIG. 2).

After the checkpointing and roll back, it is judged whether the fault is due to a software bug or a hardware trouble, and if it is judged as a hardware fault, roll back process is carried out by the system roll back module 101 (steps S9 and S14 in FIG. 2).

If it is judged as a software fault, it is judged whether or not a series of recovery processes is executed on the software fault concerned for the first time (step S11 in FIG. 2), and if it is executed for the first time, it is judged whether or not the software fault recovery action is diagnosed by the software fault recovery action determining module 106 on the basis of the information of the software fault recovery action recording areas 202 and 302 (step S12 in FIG. 2). If it is diagnosed, the software fault recovery action concerned is carried out by the software fault recovery action executing module 107 on the basis of the information of the software fault recovery action recording areas 202 and 302 (step S13 in FIG. 2), and the system restart module 102 is executed (step S14 in FIG. 2).

If the software fault recovery action is not diagnosed by the software fault recovery action determining module 106, the software execution environment operating means 108 is executed (step S15 in FIG. 2), and the system restart module 102 is executed (step S14 in FIG. 2).

When a series of recovery processes on the software is carried out for the second time (namely, when the first software recovery action has turned out invalid, and software fault has recurred) (step S16 in FIG. 2), the software module having the fault cause is cut off from the system, or the process (or thread) that is considered to have initiated the fault cause is deleted from the system (step S17 in FIG. 2).

When a series of recovery processes on the software is carried out for the third time (namely, when the second software recovery action has turned out invalid, and software fault has recurred), the system is restarted (step S18 in FIG. 2).

Embodiments according to the present invention are described hereinafter in reference to concrete software faults.

First, an embodiment according to the present invention is described in reference to a first concrete software fault. This embodiment relates to an exception in access on virtual memory.

In general, in an operating system having virtual memory method, as for access to virtual memory that does not exist in physical memory, demand paging is realized by loading (paging in) the page concerned from an external memory device or so with exception of page fault from processor as trigger.

In this case, virtual memory page as the object of paging must be accessed in a status where paging input/output processing is available. Namely, the portion to be executed under program as extension of interruption such as operating system interruption handler and so on must not be the object of paging, but it should be made to always exist in physical memory in creating a software module.

In general, in the case where consideration for the above interruption handler to always exist in physical page is neglected, an operating system judges paging in process to the virtual memory concerned impossible, and crashes system.

Figure 4:
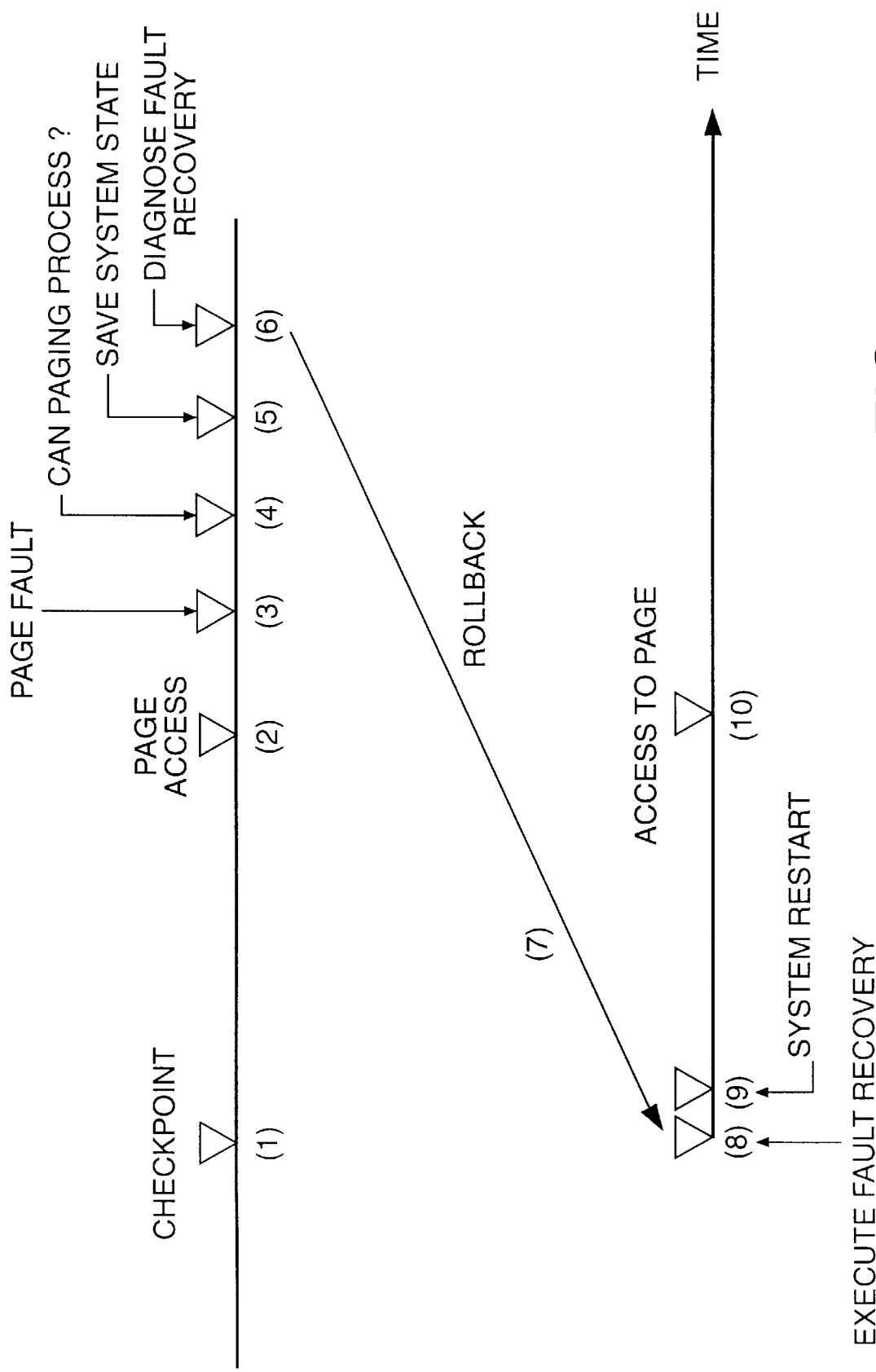
FIG. 4 is a conceptional view for explaining a recovery operation from a first example of the software error.

FIG. 4 shows a conceptual diagram of how the present invention carries out a recovery action at the occurrence of the above fault. The lines in the figure show time frame.

After sampling checkpoints ((1) in FIG. 4), in the condition mentioned above, by access to page that always exists and should not generate page fault at the moment of access on that virtual page ((2) in FIG. 4), page fault exception is informed from processor to operating system ((3) in FIG. ).

In general, in an operating system, at the occurrence of the above page fault exception, page fault handler is executed, and carries out the check whether paging processing by the page fault exception concerned is possible or not ((4) in FIG. 4).

In this check, at the occurrence of page fault, if the conditions such as [Virtual page is interruption handler], [Interruption mask has priority over interruption used by paging input/output] and so on are satisfied, it is judged as paging impossible.

In an ordinary operating system, operating system is rebooted after crash by sampling system memory dump and so on.

In the embodiment according to the present invention, after the above judgment of paging impossible, the system status at that moment (processor register, operating system stuck information, etc.) is recorded into a memory or a non-volatile memory device that is not rolled back ((5) in FIG. 4), and information for analysis of fault factor is provided.

From the above recorded log information, the software fault factor is diagnosed through the above software fault factor diagnosing means (block 105 in FIG. 1), and as part of the software fault recovery action determining module (106 in FIG. 1), action to be carried out as recovery action is diagnosed, and the action is recorded into a memory or a non-volatile memory device that is not rolled back ((6) in FIG. 4).

Then, roll back is made to the moment of checkpointing ((7) in FIG. 4).

After roll back, the action that is diagnosed as the above recovery action and recorded into a memory or a non-volatile memory device that is not rolled back is carried out as part of the above software fault recovery action executing module (block 107 in FIG. 1) ((8) in FIG. 4).

In the case of this embodiment, the software fault recovery action executing module (block 107 in FIG. 1) is to page in virtual page where page fault exception has occurred.

After the above, the system roll back module (block 102 in FIG. 1) restarts system from the moment of checkpointing ((9) in FIG. 4).

The execution of these processes prevents page fault from occurring, avoids system crash, and thereby enables preferable system operation even when there occurs access to the virtual page where page fault has occurred owing to roll back once again ((10) in FIG. 4).

Next, a software fault of a second kind and recovery action from it are explained hereinafter. In the case of a multi-processor, system, a lock mechanism is used to remove conflicts of resource operation by plural processors.

In normal cases, a lock mechanism in a multi-processor system is realized by electrically rewriting an area arranged in main memory that is called lock variable by processor. For example, if after a certain processor electrically rewrote lock variable A with a software bug, and the same processor tries to electrically rewrite lock variable A further, the lock variable A has been already locked, therefore, the further process will not go on.

In the next place, an embodiment according to the present invention is described in reference to a second concrete software fault. This embodiment relates to a dead lock by double securing an identical spin lock in exclusive control process in a multi-processor environment.

Figure 5:
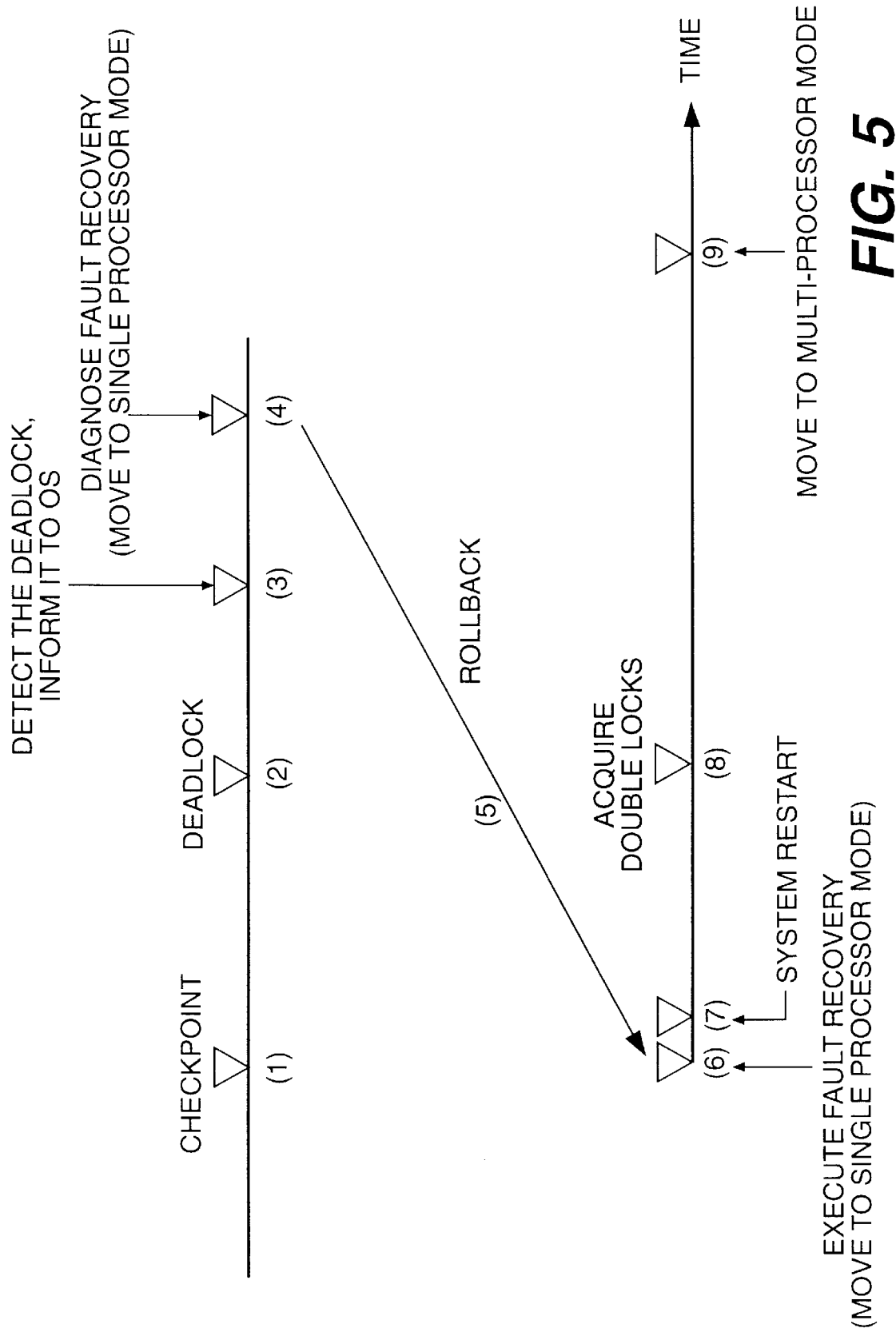
FIG. 5 is a conceptional view for explaining a recovery process for recovering a second example of occurrence of a software fault.

FIG. 5 shows a conceptual diagram how the present invention carries out a recovery action at the occurrence of the above fault. The lines in the figure show time frame.

After sampling checkpoints ((1) in FIG. 5), a dead lock occurs owing to double securing an identical spin lock ((2) in FIG. 5), and a specified spin lock counter is arranged for spin lock processing, and this counter overflows, and thereby the dead lock is detected. This dead lock fault detection process enables detecting occurrence of a fault in the operating system at the occurrence of the dead lock ((3) in FIG. 5).

At this moment, the occurrence of dead lock, the kind of lock where dead lock has occurred, the function calling conditions of the operating system that led to the occurrence of dead lock, and so on are recorded into the above memory or non-volatile memory device that is not rolled back, and information for analysis of fault factor is provided.

From the above recorded log information, the software fault factor is diagnosed through the above software fault factor diagnosing means, and as part of the software fault recovery action determining module, action to be carried out as recovery action is diagnosed, and the action is recorded into a memory or a non-volatile memory device that is not rolled back ((4) in FIG. 5).

Then, roll back is made to the moment of checkpointing ((5) in FIG. 5).

After roll back, the action that is diagnosed as the above recovery action and recorded into a memory or a non-volatile memory device that is not rolled back is carried out as part of the above software fault recovery action executing module (block 107 in FIG. 1) ((6) in FIG. 5).

In the case of a software fault of this second kind, the software fault recovery action executing means concerned (block 107 in FIG. 1 and FIG. 2) executes processing such as shifting system to single processor mode (for example, binding all the threads to a single processor, or changing lock process primitive function into interruption mask processing function that does not operate lock variable) and so on.

After the above, the system roll back module (block 102 in FIG. 1) restarts the system from the moment of checkpointing ((7) in FIG. 5).

The execution of these processes prevents the occurrence of dead lock in the case when it is necessary for a single lock to be double secured owing to roll back ((8) in FIG. 5, and avoids such software fault as does not lead to system crash such as processor unlimited loop status but hinders normal system operation, and thereby enables preferable system operation.

After a lapse of a certain time, after the above software fault is avoided, the single processor mode is returned to the multi-processor mode, and the computer system is returned to normal status ((9) in FIG. 5).

In the next place, an embodiment according to the present invention is described in reference to a third kind of software fault. This embodiment relates to the occurrence of software faults such as data destruction due to a logic mistake in software module and the like.

Figure 6:
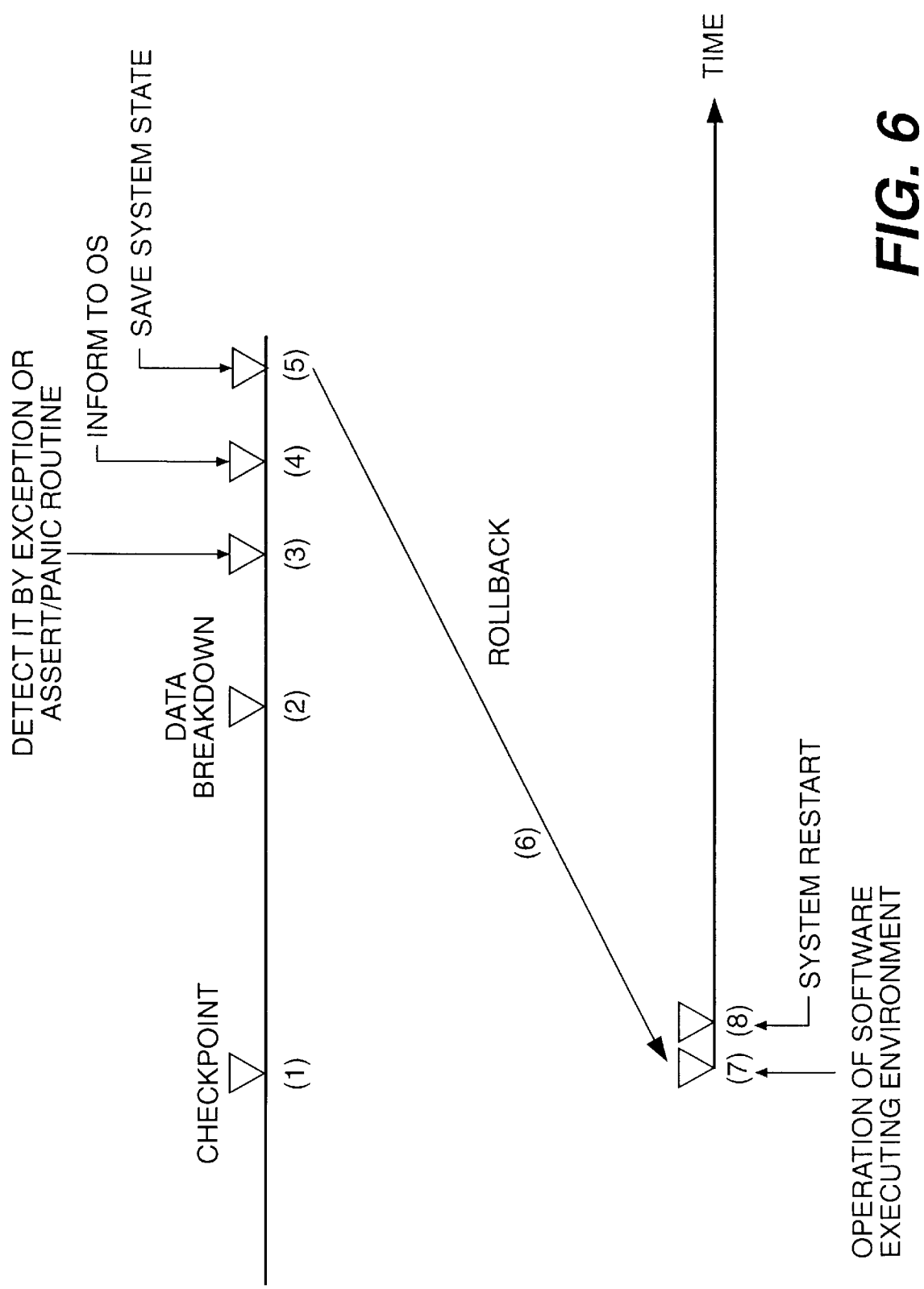
FIG. 6 is a conceptional view for explaining a process for recovering from a software fault of a third example.

FIG. 6 shows a conceptual diagram how the present invention carries out a recovery action at the occurrence of the above fault. The lines in the figure show time frame.

After sampling checkpoints ((1) in FIG.6), data is destroyed due to a logic mistake in a certain software module ((2) in FIG. 6), and occurrence of exception owing to access to improper address, or software fault due to logic coherence check routine by software (assert, panic routine, etc.) is detected ((3) in FIG. 6), and informed to operating system ((4) in FIG. 6).

In an ordinary operating system, the operating system is rebooted after a crash by sampling system memory dump and so on.

In the embodiment according to the present invention, the system status at that moment (processor register, operating system stuck information, etc.) is recorded into a memory or a non-volatile memory device that is not rolled back ((5) in FIG. 6), and information for analysis of fault factor is provided.

From the above recorded log information, the software fault factor is diagnosed through the above software fault factor diagnosing means (block 105 in FIG. 1 and FIG. 2).

In general, in data destruction due to a logic mistake of software module in this embodiment, it is difficult to diagnose a typical fault factor as in the above first and second embodiments.

Figure 7:
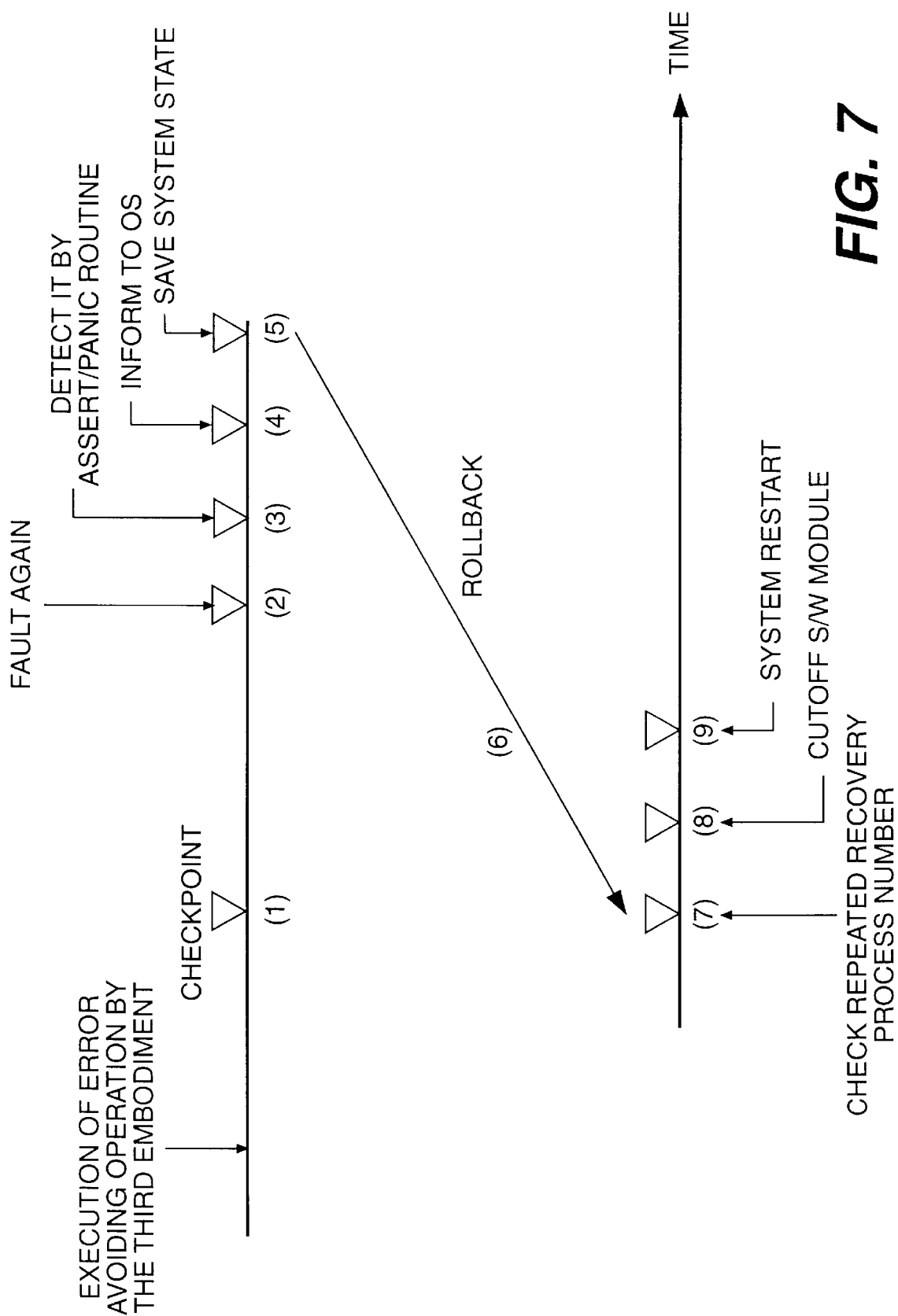
FIG. 7 is a conceptional view for explaining a process for recovering from a software fault of a fourth example.
Figure 8:
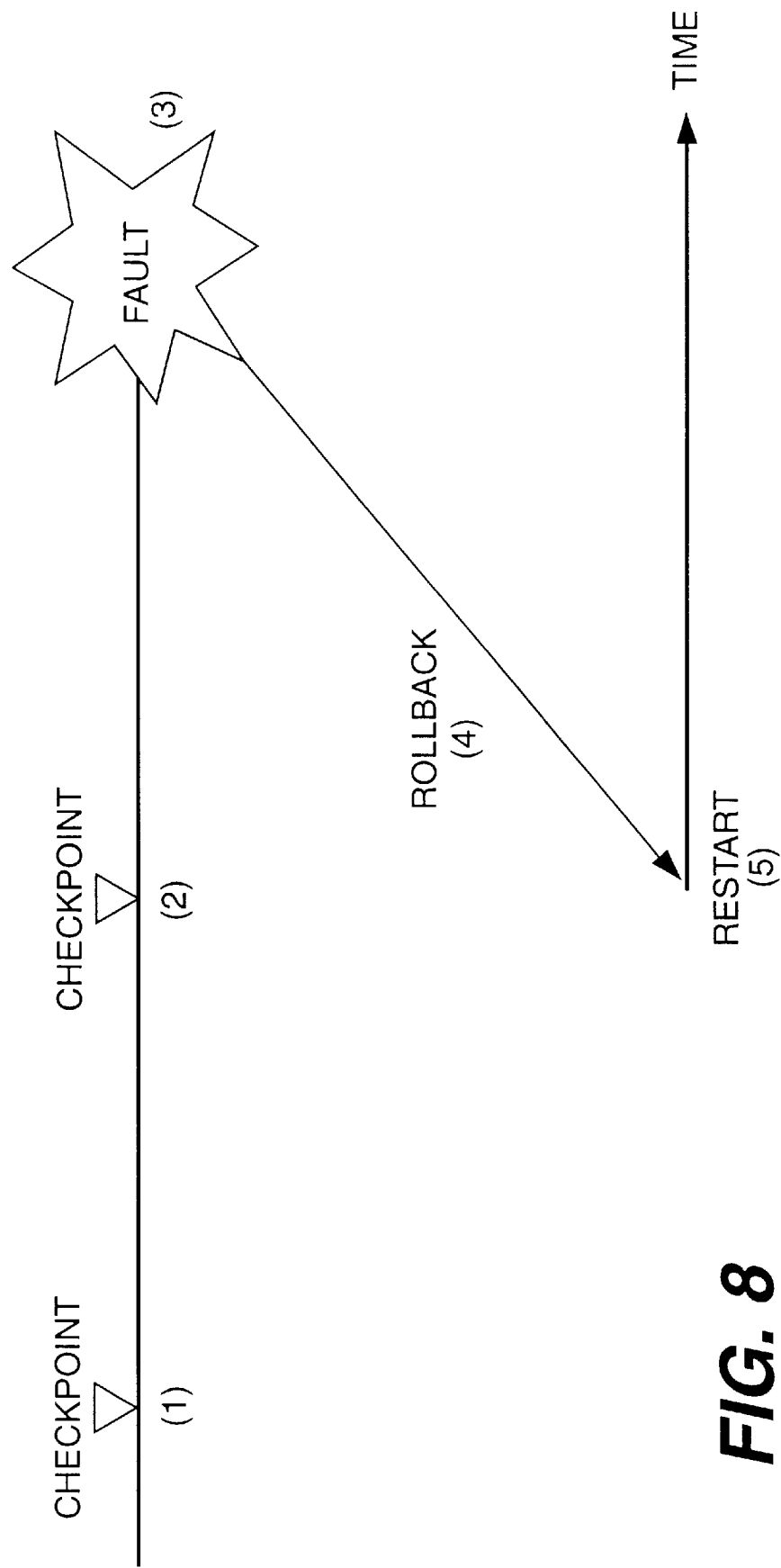
FIG. 8 is a conceptional view for explaining a checkpointing and roll back recovery from a fault.

Therefore, in a condition where it is difficult to diagnose the fault factor of this kind, roll back is made to the moment of checkpointing ((6) in FIG. 7), and then by changing the timing of software fault by [Shifting to single processor mode (binding all the treads, resources to a single processor)], [Clearing automatic variable area on stack of operating threads (avoiding omission of automatic variable initialization)], [Replenishing resources to be used in system (avoiding crash due to resource exhaustion)], [Adjusting the timing of input and output request issue (avoiding fault occurrence case due to change of issue timing and interruption timing along with input and output request)], and so on by the above software execution environment operating means, a series of software fault recovery actions having the possibility to avoid the above software fault factor are executed ((7) in FIG. 6), and then through the procedures to restart system from the moment of checkpointing ((8) in FIG. 6) by the system roll back module (block 102 in FIG. 1), the software execution environment is operated to avoid the occurrence of software fault.

After the execution of a series of the above processes, a failure may arise from a software fault again.

With regard to the processing method under such a condition, the fault recovery action in the embodiment according to the present invention with a software fault of the fourth kind shown hereinafter is executed.

This embodiment relates to the case where it is difficult to avoid the recurrence of a software fault after applying the software fault recovery action in the above embodiment with the third concrete software fault.

FIG. 7 shows a conceptual diagram of how the present invention carries out a recovery action at the occurrence of the above fault. The lines in the figure show time frame.

After the execution of the software fault recovery action in the above embodiment with the third concrete software fault, software fault recurs ((2) in FIG. 7), and occurrence of exception due to access to improper address, or software fault due to logic coherence check routine by software (assert, panic routine, etc.) is detected ((3) in FIG. 7), and informed to operating system ((4) in FIG. 7).

In an ordinary operating system, operating system is rebooted after crash by sampling system memory dump and so on.

In the embodiment according to the present invention, the system status at that moment (processor register, operating system stuck information, etc.) is recorded into a memory or a non-volatile memory device that is not rolled back ((5) in FIG. 7), and information for analysis of fault factor is provided.

After roll back is made to the moment of checkpointing ((6) in FIG. 7), if the software fault this time is judged as to have recurred after execution of a series of recovery actions, (execution of a series of recovery actions is controlled by flag or so), ((7) in FIG. 7), processes such as [Removing the software module that generated nonconformity from system], [Deleting the process (or thread) that is considered to have invited nonconformity from system] and so on are executed ((8) in FIG. 7), and the system is rebooted from the moment of checkpointing by the system roll back executing means (block 102 in FIG. 1) ((9) in FIG. 7), thereby, the occurrence of software nonconformity is avoided.

The software module cut off from the system by the above action [Removing the software module that generated nonconformity from system] may be exchanged after the cause of the software fault factor is investigated and software module is corrected from the above system status (recorded into a memory or a non-volatile memory unit that is not rolled back) without system stop to the corrected software.

For example, in a UNIX operating system, input and output interface for an individual device driver has a common structure called device switch table, and by changing the corresponding device driver entry in this table, releasing resource that device driver is using, and so on, it may be cut off from system.

If the software fault recurs even after these actions, rebooting system avoids the unlimited execution of a series of software fault recovery actions.

Next, the action flow of a computer system according to the second embodiment of the present invention is explained hereinafter with reference to the flowchart shown in FIG. 3.

At the occurrence of a fault in the system, the fault identification module 103 identifies whether the fault is a hardware fault (a fault arising from hardware trouble) or a software fault (a fault arising from software bug) (step F1 in FIG. 3).

When the fault is judged as a hardware fault, system roll back is carried out by the checkpointing and roll back module 101 (steps F1 and F8 in FIG. 3).

When the fault is judged as a software fault, the system status (processor register, stack contents, etc.) is recorded into the software fault status recording areas 200 and 300 by the system state recording means 104 (step F3 in FIG. 3).

The software fault type diagnosing module 105 judges whether the software fault factor concerned can be diagnosed or not, and if it judges it impossible, system roll back is carried out by the checkpointing and roll back module 101 (steps F4 and F8 in FIG. 3).

When the software fault factor concerned can be diagnosed, the fault factor of the software fault diagnosed by the software fault factor diagnosing module 105 is recorded into the software fault factor logs 201 and 301 (step F5 in FIG. 3).

Then the recovery action of the software fault concerned is diagnosed by the software fault recovery action determining module 106 (step F6 in FIG. 3), and the software fault recovery action concerned is recorded into the software fault recovery action recording areas 202 and 302(step F7 in FIG. 3), and system roll back is carried out by the checkpointing and roll back means 101 (step F8 in FIG. 3).

After the checkpointing and roll back, the trouble is judged whether one arising from a software fault or one arising from a hardware fault, and if it is judged as a hardware fault, roll back process is carried out by the system restart module 102 (steps F9 and F14 in FIG. 3).

If the trouble is judged as one arising from a software fault, it is judged whether or not a series of recovery processes is within the prescribed frequency "N" (step F11 in FIG. 3), and if it is executed within the prescribed frequency "N", it is judged whether or not the software fault recovery action is diagnosed by the software fault recovery action determining module 106 on the basis of the information of the software fault recovery action recording areas 202 and 302 (step F12 in FIG. 3). If it is diagnosed, the software fault recovery action concerned is carried out by the software fault recovery action executing module 107 on the basis of the information of the software fault recovery action recording areas 202 and 302 (step F13 in FIG. 3), and the system restart module 102 is executed (step F14 in FIG. 3).

If the software fault recovery action is not diagnosed by the software fault recovery action determining module 106, the software execution environment operating means 108 is executed (step F15 in FIG. 3), and the system restart module 102 is executed (step F14 in FIG. 3).

When a series of recovery processes on the software is not carried out within the prescribed frequency "N", system is booted (step F16 in FIG. 3).

The processes from the above step F1 through the step F14 are repeated for the times up to the prescribed frequency "N" until a software fault is recovered from system.

In general, after the first recovery action is carried out on the first software fault and system is rebooted, if the second software fault occurs, the cause of the occurrence lies in the same factor of the first software fault or a different factor. After this, with regard to a series of actions within the prescribed frequency "N", the fault factor is analyzed individually, and recovery action is executed according to each fault factor.

As described heretofore, according to the present invention, it is possible to provide a method for recovering from a software fault in a checkpointing and roll back type fault tolerant computer system by rolling back data processing from the status before the occurrence of fault at the occurrence of fault with system, which identifies the occurrence of so called software faults such as system crash arising from software bug or processor unlimited loop status that does not lead to system crash but hinders normal system operation, and diagnoses the software fault factor by making use of status information and sampling at the moment of of the above identification, or rolls back the system to the moment of checkpointing by changing system environment, and avoids software fault arising from the above software bug, thereby it is possible not only to recover from hardware intermittent fault but also to continue operating computer system even after occurrence of a software fault, and further to improve system operability to a great extent.

What is claimed is:

1. A method for recovering from a software fault in a checkpointing and roll back type fault tolerant computing system, comprising the steps of:

identifying whether or not the fault is a software fault;

recording a faulty portion of an internal state of the system when the fault is a software fault;

diagnosing a type of the software fault by using the recorded faulty portion of an internal state of the system;

determining an execution environment changing operation for the diagnosed type of the software fault; and executing the execution environment changing operation when the internal state of the system is rolled back to a checkpoint which was acquired just before occurrence of the software fault.

2. The method for recovering from a software fault in a computer system as set forth in claim 1, wherein:

at least the action by the execution environment changing operation executing step is repeated within a prescribed frequency until the software fault is avoided.

3. The method for recovering from a software fault in a computer system as set forth in claim 1, wherein:

at the recurrence of the software fault after execution of the execution operation changing operation executing step and reexecution of the system, a software module having the fault is cut off from the system and then the system is reexecuted.

4. The method for recovering from a software fault in a computer system as set forth in claim 1, wherein:

at the recurrence of the software fault after execution of the execution operation changing operation executing step and reexecution of the system, a process or thread that has the software fault is deleted from the system, and then the system is reexecuted.

5. The method for recovering from a software fault in a computer system as set forth in claim 1, wherein:

in the recurrence of the software fault after at least the action by the execution operation changing operation executing step is repeated within a prescribed frequency until the software fault is avoided, at which time the system is rebooted.

6. The method for recovering from a software fault in a computer system as set forth in claim 1, wherein:

the faulty portion recording step records the system status at the moment of occurrence of the software fault into a memory area or a non-volatile memory device that is not rolled back as information to be provided for the analysis of the fault type in the software fault.

7. The method for recovering from a software fault in a computer system as set forth in claim 1, wherein:

the software fault type diagnosing step records the diagnosed fault type into a memory area or a non-volatile memory device that is not rolled back as information to be provided for the analysis of the fault type.

8. The method for recovering from a software fault in a computer system as set forth in claim 1, wherein:

the execute environment changing operation determining step records the execute environment changing operation into a memory or a non-volatile memory device that is not rolled back as information to be provided for the execution of the execution environment changing operation.

9. The method for recovering from a software fault in a computer system as set forth in claim 1, wherein:

the faulty portion recording step writes a dump of a system memory and data at the moment of the software fault into an external memory device at a request from a user, and provides the dump as information for the analysis of the fault type of the software fault.

10. The method for recovering from a software fault in a computer system as set forth in claim 1, wherein:

the execution environment changing operation executing step executes the determined execution environment changing operation when the software fault type diagnosing step diagnoses that the software fault type has access to a virtual memory not loaded on physical memory and the execution environment changing operation determining step determines to secure physical memory regarding virtual memory as the execution environment changing operation for the fault type of the software fault.

11. The method for recovering from a software fault in a computer system as set forth in claim 1, wherein:

the execution environment changing operation executing step executes the determined execution environment changing operation when the software fault type diagnosing step diagnoses that the software fault type is a dead lock regarding exclusive control in a multiprocessor environment and the execution environment changing operation executing step determines to change a number of operating processors and change a code to execute exclusive control as the execution environment changing operation for the fault type of the software fault.

12. The method for recovering from a software fault in a computer system as set forth in claim 7, wherein:

information recorded in a memory or a non-volatile memory device that is not rolled back is recorded through a system log mechanism that the computer system has as part of a checkpoint sampling means after recovery from the software fault.

13. The method for recovering from a software fault in a computer system as set forth in claim 8, wherein:

information recorded in a memory or a non-volatile memory device that is not rolled back is recorded through a system log mechanism that the computer system has as part of a checkpoint sampling means after recovery from the software fault.

14. A method for recovering from a software fault in a checkpointing and roll back type fault tolerant computer system to realize fault tolerance and to recover from a software fault arising from a software bug and the like by re-executing the system at the occurrence of the software fault, comprising:

a fault identifying step to identify a software fault at its occurrence arising from a software bug;

a system status recording step to record the system status at the occurrence of the software fault arising from the software bug;

a software execution environment operating step to change a program execution environment after roll back on the basis of information recorded in the system status recording step; wherein the method includes:

a fault recovery function to avoid the software fault arising from the software bug and the like by rolling back the system at the occurrence of the software fault in the system.

15. A method for recovering from a software fault in a checkpointing and roll back type fault tolerant computer system to realize fault tolerance and to recover from a software fault arising from a software bug and the like by re-executing the system at the occurrence of the software fault, comprising:

a fault identifying step to identify whether or not the fault is a software fault at its occurrence arising from the software bug in the system;

a system status recording step to record the system status at the occurrence of the software fault arising from the software bug;

a software fault factor diagnosing step to diagnose a fault factor of the software fault on the basis of information recorded in the system status recording step;

a software fault recovery action determining step to determine a recovery action responsive to the fault factor of the software fault diagnosed in the software fault factor diagnosing step;

a software fault recovery action executing step to execute the recovery action of the fault factor of the software fault determined in the software fault recovery action determining step after roll back;

a software execution environment operating step to change a program environment after roll back on the basis of information recorded in the system status recording step; and wherein when it is difficult to determine the recovery action by the diagnosis of the fault factor of the software fault at the occurrence of the software fault, the software execution environment is operated by the software execution environment operating step, and the system is re-executed, and thereby the software fault arising from the software bug is avoided.

16. The method for recovering from a software fault in a computer system set forth in claims 2 or 15, wherein:

at least the action by the software execution environment operating step is repeated within a prescribed frequency until the software fault is avoided.

17. The method for recovering from a software fault in a computer system set forth in claims 2 or 15, wherein:

at the recurrence of the software fault after execution of the software execution environment operating step and re-execution of the system, a software module having the fault is cut off from the system, and then the system is re-executed.

18. The method for recovering from a software fault in a computer system set forth in claims 2 or 15, wherein:

at the recurrence of the software fault after execution of the software execution environment operating step and re-execution of the system, a process or thread that has the software fault is deleted from the system, and then the system is re-executed.

19. The method for recovering from a software fault in a computer system set forth in claim 17, wherein:

the software module cut off from the system may be changed from the software module having the fault into a software module which lacks a cause of the fault in the system operating status without stopping the system.

20. The method for recovering from a software fault in a computer system set forth in claims 2 or 15, wherein:

in the case of recurrence of the software fault after at least the action by the software execution environment operating step is repeated within a prescribed frequency until the software fault is avoided, at which time the system is rebooted.

21. The method for recovering from a software fault in a computer system set forth in claims 2 or 15, wherein:

the system status recording step records the system status at the moment of the occurrence of the software fault into a memory area or a non-volatile memory device that is not rolled back as information to be provided for the analysis of the fault factor of the software fault.

22. The method for recovering from a software fault in a computer system set forth in claims 2 or 15, wherein:

the system status recording step writes a dump of a system memory and data at the moment of the software fault into an external memory device at a request from a user, and provides the dump as information for the analysis of the fault factor of the software fault.

23. The method for recovering from a software fault in a computer system set forth in claims 14 or 15, wherein:

the software execution environment operating step changes a number of operating processors as one of the software execution environment operations.

24. The method for recovering from a software fault in a computer system set forth in claims 14 or 15, wherein:

the software execution environment operating step clears an automatic variable area on a stack regarding process or thread that has invited the software fault as one of the software execution environment operations.

25. The method for recovering from a software fault in a computer system set forth in claims 14 or 15, wherein:

the software execution environment operating step dynamically replenishes resources to be used in the system as one of the software execution environment operations.

26. The method for recovering from a software fault in a computer system set forth in claims 14 or 15, wherein:

the software execution environment operating step adjusts an issue timing of input and output requests as one of the software execution environment operations.

27. The method for recovering from a software fault in a computer system set forth in claim 21, wherein:

information recorded in a memory or a non-volatile memory device that is not rolled back is recorded through a system log mechanism that the computer system has as part of a checkpoint sampling means after recovery from the software fault.

28. The method for recovering from a software fault in a computer system set forth in claim 15, wherein:

the software fault factor diagnosing step records the diagnosed fault factor into a memory area or a non-volatile memory device that is not rolled back as information to be provided for the analysis of the fault factor.

29. The method for recovering from a software fault in a computer system set forth in claim 15, wherein:

the software fault recovery action determining step records the recovery action to th e diagnosed software fault factor into a memory area or a non-volatile memory device that is not rolled back as information to be provided for the execution of the fault recovery action.

30. The method for recovering from a software fault in a computer system as set forth in claim 28, wherein:

information recorded in a memory or a non-volatile memory device that is not rolled back is recorded through a system log mechanism that the computer system has as part of a check point sampling means after recovery from the software fault.

31. The method for recovering from a software fault in a computer system as set forth in claim 29, wherein:

information recorded in a memory or a non-volatile memory device that is not rolled back is recorded through a system log mechanism that the computer system has as part of a checkpoint sampling means after recovery from the software fault.

32. The method for recovering from a software fault in a computer system set forth in claim 15, wherein:

the software recovery action executing step executes the determined recovery action when the software fault factor diagnosing step diagnoses that the software fault factor has access to a virtual memory not loaded on physical memory, and the software fault recovery action determining step determines to secure physical memory regarding virtual memory as the recovery action for the fault factor of the software fault.

33. The method for recovering from a software fault in a computer system set forth in claim 15, wherein:

the software recovery action executing step executes the above determined recovery action when the software fault factor diagnosing step diagnoses that the software fault factor is dead lock regarding exclusive control in a multiprocessor environment, and the software fault recovery action determining step determines to change a number of operating processors and change a code to execute exclusive control as the recovery action for the fault factor of the software fault.

34. The method for recovering from a software fault in a computer system set forth in claim 33, wherein:

the recovery action regarding to dead lock regarding to exclusive control in a multiprocessor environment is carried out, and after the system is re-executed, if the software fault is avoided, the number of operating processors and the code to execute exclusive control are reset to original conditions as part of a later checkpoint sampling means, and the system is reset to the operation status before the occurrence of the software fault.

\* \* \* \* \*